United States Patent
Sato et al.

(10) Patent No.: US 8,253,962 B2
(45) Date of Patent: Aug. 28, 2012

(54) IMAGE FORMING APPARATUS, COMPUTER READABLE STORAGE MEDIUM AND IMAGE FORMATION PROCESSING METHOD

(75) Inventors: Kunikazu Sato, Chofu (JP); Fumihito Akiyama, Yokohama (JP); Yoshinori Tanaka, Koganei (JP); Masahiro Ozawa, Hino (JP); Jun Kuroki, Sagamihara (JP); Hiroshi Nogawa, Hachioji (JP); Yasufumi Aoyama, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 689 days.

(21) Appl. No.: 12/407,209

(22) Filed: Mar. 19, 2009

(65) Prior Publication Data

US 2009/0316167 A1    Dec. 24, 2009

(30) Foreign Application Priority Data

Jun. 19, 2008   (JP) ................. 2008-160142

(51) Int. Cl.
*G06F 3/12* (2006.01)
(52) U.S. Cl. ........ 358/1.15; 358/1.16; 358/1.9; 709/203
(58) Field of Classification Search .................. 358/1.15, 358/1.16, 1.9, 1.13; 709/203
See application file for complete search history.

(56) References Cited

U.S. PATENT DOCUMENTS

| | | | | |
|---|---|---|---|---|
| 3,655,377 A | * | 4/1972 | Sechak .................. | 430/57.8 |
| 4,891,299 A | * | 1/1990 | Yamada .................. | 430/202 |
| 5,692,117 A | * | 11/1997 | Berend et al. ........... | 345/475 |
| 6,361,431 B1 | * | 3/2002 | Kawano .................. | 454/228 |
| 6,546,188 B1 | * | 4/2003 | Ishii et al. ............. | 386/280 |
| 6,906,821 B1 | * | 6/2005 | Hanazono et al. ........ | 358/1.16 |
| 6,943,906 B2 | * | 9/2005 | Murata .................. | 358/1.13 |
| 7,099,506 B2 | * | 8/2006 | Mishima ................. | 382/166 |
| 7,109,986 B2 | * | 9/2006 | Kerr et al. ............. | 345/418 |
| 7,202,838 B2 | * | 4/2007 | Kerr et al. ............. | 345/1.2 |
| 7,528,980 B2 | * | 5/2009 | Tanaka .................. | 358/1.15 |
| 7,596,750 B2 | * | 9/2009 | Inose .................... | 715/255 |
| 7,603,409 B2 | * | 10/2009 | Kobayashi et al. ...... | 709/203 |
| 8,054,478 B2 | * | 11/2011 | Tanaka et al. .......... | 358/1.13 |
| 2007/0296749 A1 | * | 12/2007 | Mizutani et al. ........ | 347/14 |

FOREIGN PATENT DOCUMENTS

| | | |
|---|---|---|
| JP | 2000-324317 A | 11/2000 |
| JP | 2004-341902 A | 12/2004 |
| JP | 2005-049885 A | 2/2005 |
| JP | 2005-182692 | 7/2005 |
| JP | 2005-258578 A | 9/2005 |
| JP | 2008-001068 A | 1/2008 |
| JP | 2008-005531 A | 1/2008 |

OTHER PUBLICATIONS

Office Action for Japanese Application No. 2008-160142 dated Apr. 13, 2010.

\* cited by examiner

*Primary Examiner* — Negussie Worku
(74) *Attorney, Agent, or Firm* — Finnegan, Henderson, Farabow, Garrett & Dunner, L.L.P.

(57) ABSTRACT

An image forming apparatus that executes an image forming process based on print data including an execution command of transparency processes to be executed, comprises: a first storage unit to be used when the transparency process is executed; and a control unit for controlling the first number of transparency processes to be executed when a storage capacity of the first storage unit is insufficient to execute the transparency processes to be executed, and causing a display unit to display a preview image to which the second number of executable transparency processes different from the first number has been executed to determine an image being an object for print output based on an instruction by an operator relating to which transparency process is executed.

15 Claims, 11 Drawing Sheets

IMAGE FORMING APPARATUS, COMPUTER READABLE STORAGE MEDIUM AND IMAGE FORMATION PROCESSING METHOD

BACKGROUND OF THE INVENTION

1. Field of the Invention

The invention relates to an image forming apparatus, a computer readable storage medium and an image forming method.

2. Description of Related Art

In recent years, image forming apparatuses, such as a printer and an MFP (Multi Function Peripheral), have been widely used. This image forming apparatus receives data (PDL data) having a format of a PDL (Page Description Language), such as a PS (Post Script (registered trademark)) created by an external device such as a PC (Personal Computer) or a PCL (Printer Control Language), through a network such as a LAN, converts the received data into data having an intermediate format (intermediate data), rasterizes the intermediate data to generate bitmap data, and performs a print.

Further, an image forming apparatus has increased, which receives PDF data and XPS data without converting the PDF data and the XPS data into PDL data on a printer driver in an external apparatus and so on, converts the received data into intermediate data, rasterizes the intermediate data to generate bitmap data, and performs a print. This process is called a PDF direct print and an XPS direct print.

Print data, such as the PDF data or the XPS data, has a transparency function that transparently overlaps a plurality of image data and displays one image.

Meanwhile, when the image forming apparatus executes a transparency process (process using a transparency function), the image forming apparatus needs a large amount of memories, but the amount of memories that can be mounted in the image forming apparatus is limited. Therefore, various researches to effectively use the limited amount of memories have been performed.

For example, Japanese Laid-Open Patent Publication (JP-A) No. 2005-182692 discloses the following technology. When receiving a drawing command that includes a transparency process, an image forming apparatus automatically determines whether the drawing command allows drawing to be performed even if the transparency process is not executed. When it is determined that the drawing command allows drawing to be performed when the transparency process is not executed, the image forming apparatus changes the drawing command into a drawing command that does not include a transparency process.

However, according to the technology that is disclosed in JP-A No. 2005-182692, since the image forming apparatus automatically determines contents of the transparency process, there are cases where users cannot obtain their desired process results (print result) at all.

Further, as described above, during the transparency process, the image forming apparatus needs a large amount of memories. Therefore, when the amount of memories is insufficient, the transparency process may be changed into a low-speed process using an HDD (Hard Disk Drive), or the transparency process cannot be executed and a print error may be generated.

SUMMARY

The present invention is provided to solve at least one of the above mentioned problems or other problems. The object of the present invention is to provide the most proper processing result obtained according to processes desired by a user in an image forming process to be performed based on print data including an execution command of the transparency process.

To achieve at least one of the aforementioned objects or other objects, an image forming apparatus reflecting one aspect of the present invention that executes an image forming process based on print data including an execution command of transparency processes to be executed, comprises:

a first storage unit to be used when the transparency process is executed; and a control unit for controlling the first number of transparency processes to be executed when a storage capacity of the first storage unit is insufficient to execute the transparency processes to be executed, and causing a display unit to display a preview image to which the second number of executable transparency processes different from the first number has been executed to determine an image being an object for print output based on an instruction by an operator relating to which transparency process is executed.

Preferably, the control unit calculates the second number of executable transparency processes based on a usable storage capacity (i.e., an available storage capacity) of the first storage unit, calculates the first number of transparency processes to be executed based on the print data, and judges whether the storage capacity of the first storage unit is insufficient or not to execute the transparency processes to be executed by comparing the first number and the second number.

Preferably, the image forming apparatus further comprises:

a second storage unit an access speed of which is lower than that of the first storage unit, wherein the control unit uses the second storage unit to execute the transparency processes to be executed when the storage capacity of the first storage unit is insufficient to execute the transparency processes to be executed.

Preferably, the control unit controls the first number of transparency processes to be executed so as to give priority to an image quality of the image being the object for the print output when the storage capacity of the first storage unit is insufficient to execute the transparency processes to be executed.

Preferably, the control unit controls the first number of transparency processes to be executed so as to give priority to a processing speed of the image forming process when the storage capacity of the first storage unit is insufficient to execute the transparency processes to be executed.

Preferably, the image processing apparatus further comprising:

the display unit; and an operation unit for receiving the instruction by the operator, wherein the control unit determines the image being the object for the print output based on the instruction received by the operation unit relating to which transparency process is executed.

BRIEF DESCRIPTION OF THE DRAWINGS

The above and other objects, advantages and features of the present invention will become more fully understood from the detailed description given below and the appended drawings, and the following descriptions pertain to the embodiment of the present invention are not intended to limit the present invention, and wherein:

FIG. 9 is a flowchart illustrating selection transparency processes;

DESCRIPTION OF THE PREFERRED EMBODIMENTS

In the following embodiments, the features and the operations of an image forming apparatus of the present invention will described in detail with reference to the attached drawings.

<System Configuration of Image Forming Systems>

Figure 1:
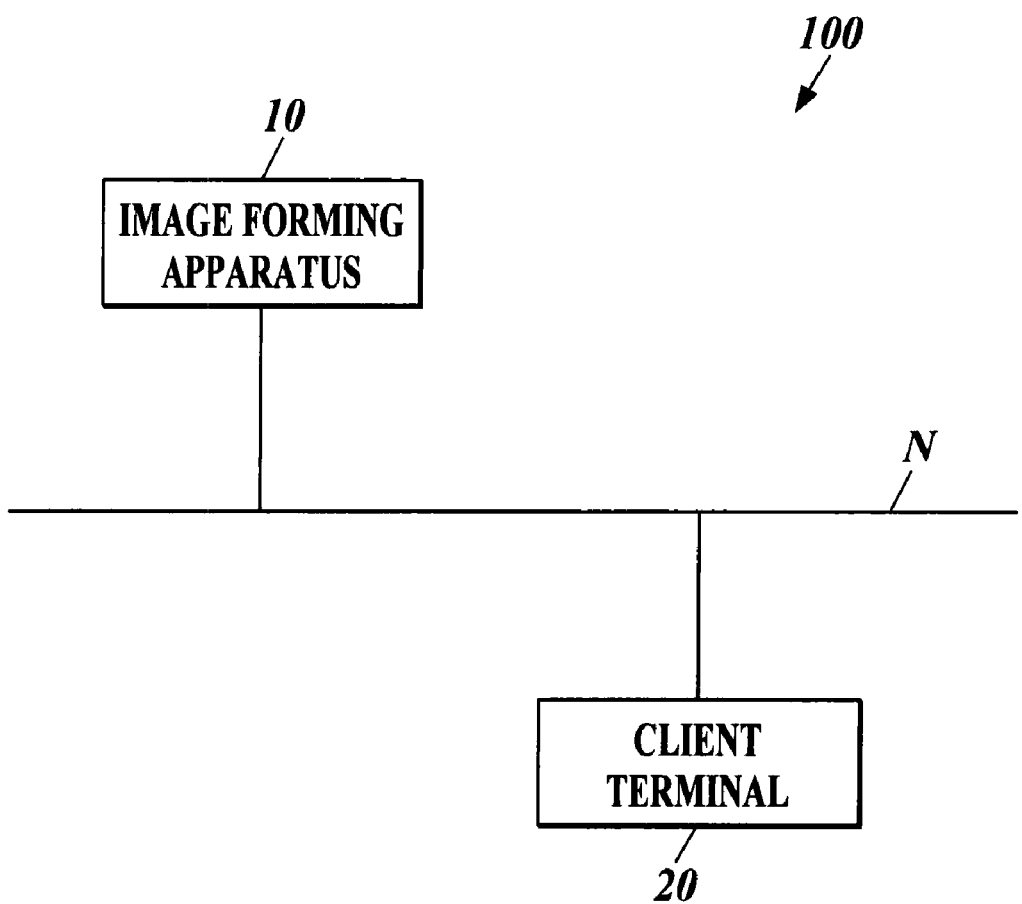
FIG. 1 shows a system configuration of an image forming system.

FIG. 1 shows a system configuration of an image forming system 100. As shown in FIG. 1, the image forming system 100 is composed of an image forming apparatus 10 and client terminal 20, and each apparatus is connected to each other through a communication network N in a state capable of performing data communications.

The image forming apparatus 10 is the so-called Multi-Function Peripheral (MFP) including a copy function, an image reading function, and a printer function, and forms an image on a sheet based on a print job (print instruction) sent from the client terminal 20, image data read by an image reading section, such as a scanner, provided in the image forming apparatus 10, and the like.

The client terminal 20 is the so-called personal computer, and has the function of sending a print job to the image forming apparatus 10. A printer driver program (hereinafter, sometimes simply referred to as a printer driver) is installed in the client terminal 20, and the client terminal 20 uses the function of the printer driver to generate a print job including the data of print conditions (print request data) to be applied at the time of image formation, image data (print data), and the like, and to send the generated print job to the image forming apparatus 10.

<Functional Configuration of Client Terminal>

Figure 2:
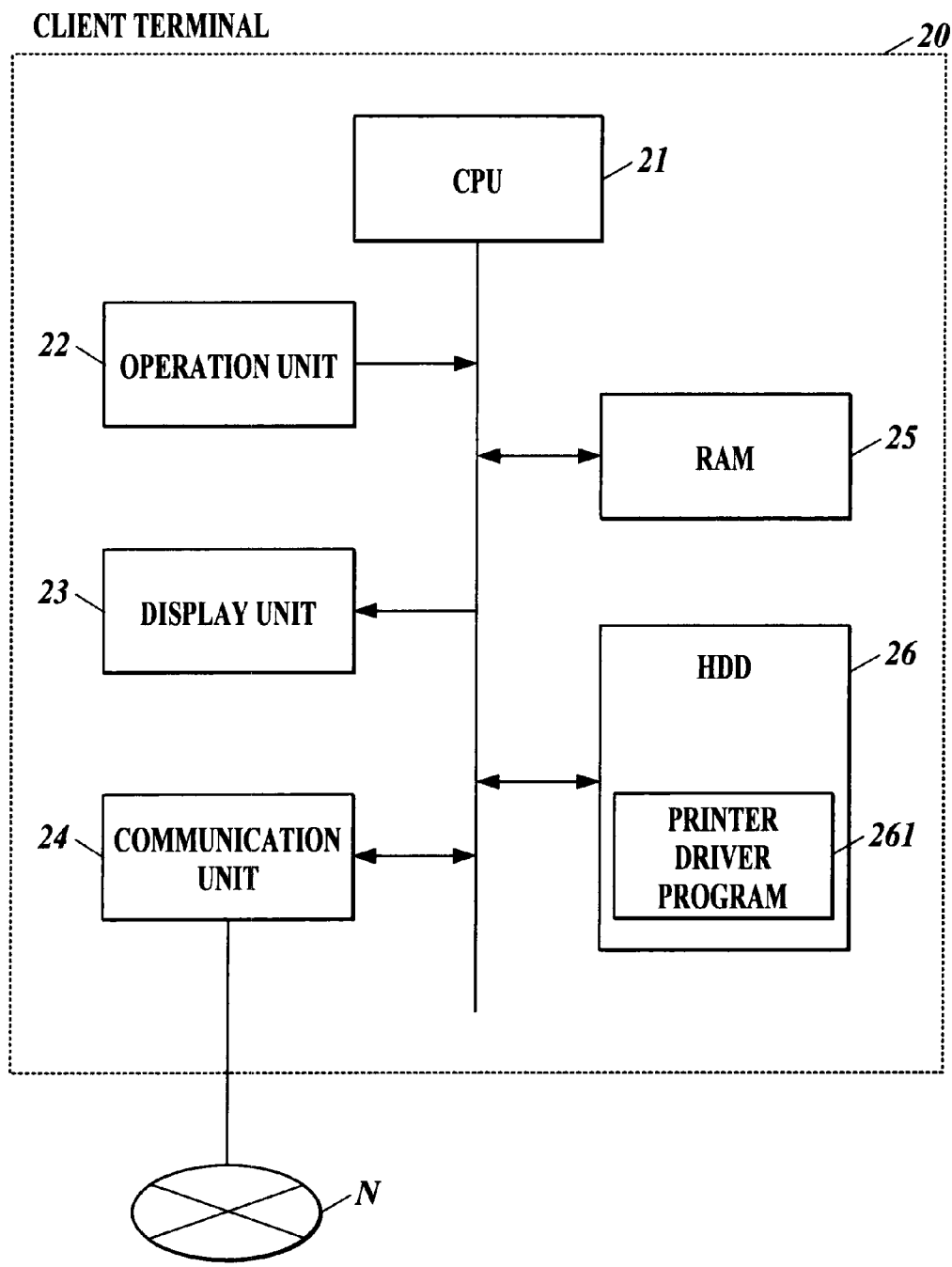
FIG. 2 shows a configuration of a client terminal.

FIG. 2 shows the configuration of the client terminal 20. As shown in FIG. 2, the client terminal 20 is composed of a CPU 21, operation section 22, display section 23, communication section 24, Random Access Memory (RAM) 25, and HDD 26.

The CPU 21 reads various processing programs stored in the HDD 26 and develops the read processing programs in a work area formed in the RAM 25 to perform various kinds of control processing in cooperation with the programs according to operation signals (instruction signal) input from the operation section 22 or instruction signals received by the communication section 24.

The operation section 22 is composed of a keyboard including cursor keys, numeral inputting keys, various function keys, and the like, and a pointing device, such as a mouse, and outputs an instruction signal input by a key operation on the keyboard or a mouse operation to the CPU 21.

The display section 23 is composed of a Liquid Crystal Display (LCD) and displays an input instruction from the operation section 22, data, and the like, according to the instruction of a display signal input from the CPU 21.

The communication section 24 includes a LAN adapter, a router, a terminal adapter (TA), and the like, and performs sending and receiving of data with external equipment such as the image forming apparatus 10 connected through the communication network N.

The RAM 25 forms a work area to temporarily store the various processing programs to be executed by the CPU 21 and the data concerning these programs.

The HDD 26 is a storage apparatus and stores various programs, setting data, image data, and the like. Moreover, the HDD 26 stores a printer driver program 261.

The CPU 21 reads the printer driver program 261 from the HDD 26 to develop the read printer driver program 261 to the RAM 25, and sends print request data and print data to the image forming apparatus 10 in cooperation with the program 261. The print data is PDL data, PDF data, XPS data, or the like.

<Functional Configuration of Image Forming Apparatus>

Figure 3:
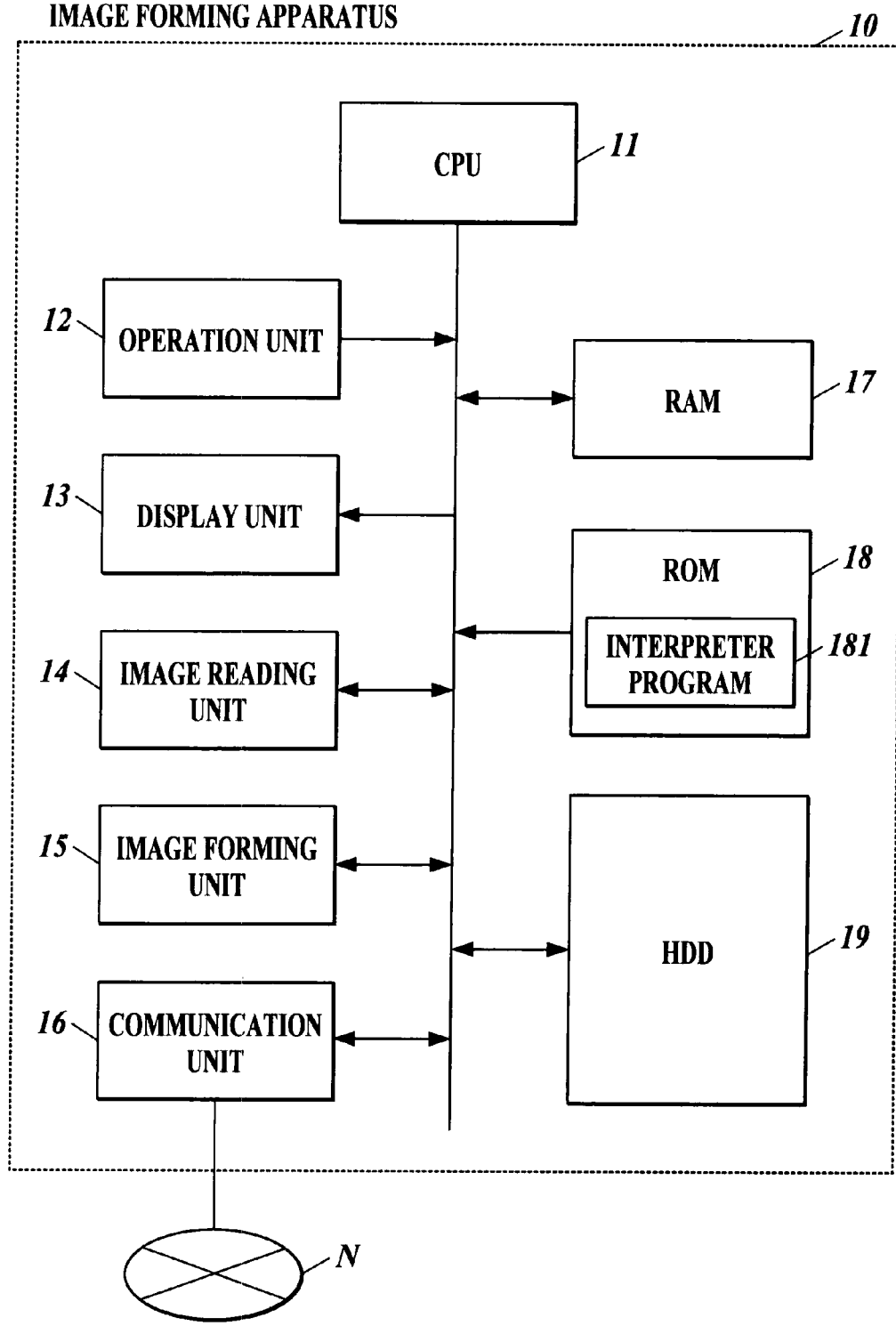
FIG. 3 shows a block diagram of the image forming apparatus.

FIG. 3 shows the configuration of the image forming apparatus 10. As shown in FIG. 3, the image forming apparatus 10 is composed of a CPU 11, operation section 12, display section 13, image reading section 14, image forming section 15, communication section 16, RAM 17, Read Only Memory (ROM) 18, and HDD 19.

The CPU 11 reads the various processing programs stored in the ROM 18 and develops the read processing programs to a work area formed in the RAM 17 to perform various kinds of control processing in cooperation with the expanded programs according to operation signals (instruction signal) input from the operation section 12 or instruction signals received by the communication section 16. For example, the CPU 11 performs a sequence of processing concerning forming the image.

The operation section 12 includes various keys, such as numeral keys, a start key, and a reset key, and outputs the depression signal of a depressed key to the CPU 11. Moreover, the operation section 12 is equipped with a touch panel integrally formed with the display section 13, and detects the position on the touch panel against which a fingertip of a user, a touch pen, or the like, touches to output a position signal to the CPU 11.

The image reading section 14 is the so-called scanner, which reads a document image to generate image data, and includes a platen glass on which a document is placed, and a scanning optical system, which scans the document image on the platen glass to form the image thereof on a CCD image sensor. The image reading section 14 performs the analog to digital (A/D) conversion of an image signal generated based on the document image read by the CCD image sensor to generate a digital image signal.

The image forming section 15 is a functional section including constituent elements necessary for forming an image by using an image forming process, such as an electrophotographic printing process, an electrostatic recording process, a thermal transfer process, etc. For example, the image forming section 15 is composed of a photosensitive body, a transfer belt, a fixing device, various conveying belts, an electronic circuit, a sheet feeding section, a sheet ejection section and the like. The image forming section 15 forms an image on a sheet supplied from the sheet feeding section based on the image data generated by the image reading section 14, the print data received by the communication section 16, or the like, to convey the sheet to the sheet ejection section in accordance with an instruction of the CPU 11. Moreover, the sheet feeding section includes a sheet feeding tray, and the sheet ejection section includes a sheet ejection tray.

The communication section 16 includes a Local Area Network (LAN) adapter, a router, a Terminal Adapter (TA), and the like, and performs the sending and receiving of data with external equipment, such as the client terminal 20, connected to the communication section 16 through the communication network N. For example, the communication section 16 receives print job data (print request data and print data) from the client terminal 20.

The RAM 17 forms a work area to temporarily store the various processing programs to be performed by the CPU 11 and the data concerning these programs. Moreover, the RAM 17 stores intermediate data mentioned later.

The ROM 18 stores various processing programs to be performed by the CPU 11, various pieces of data, and the like. These various programs are stored in the forms of readable program codes, and the CPU 11 sequentially performs the operations in accordance with the program codes. Also, the ROM 18 stores an interpreter program 181.

The HDD 19 is a storage apparatus and stores the image data read by the image reading section 14, the print data (PDL data, PDF data, XPS data), or the like received from the client terminal 20 by the communication section 16, a usage frequency list 191 generated by the CPU 11, and the like. Moreover, the storage capacity of the HDD 19 is larger than that of the RAM 17. Moreover, the access speed of the HDD 19 from the CPU 11 is slower than that of the RAM 17.

The CPU 11 reads the interpreter program 181 from the ROM 18 and develops the interpreter program 181 on the RAM 17. The CPU 11 analyzes or parses the print data received from the client terminal 20 by communication unit 16 in cooperation with the program, and generates intermediate data of the print data and bitmap data. Herein after, for expedient of explanation, cooperative processes of the CPU 11 and the interpreter program 181 will be often explained as processes of the CPU 11.

The intermediate data is data which has not been developed to the bitmap data to be obtained after analyzing or parsing the print data, and the intermediate data can be stored by a capacity smaller than that of the bitmap data. The intermediate data is generated according to the features of the objects (text data, graphics data, image data, etc.) contained in the print data. For example, data of vector format is mentioned as the intermediate data of the text data or the graphics data, and data of image format is mentioned as the intermediate data of the image data.

Moreover, the CPU 11 analyzes or parses the print data and judges whether the print data includes the execution command of the transparency process. When the print data includes an execution command of the transparency process, the CPU 11 performs the transparency process mentioned later.

Next, the CPU 11 performs the rasterizing process to the intermediate data, and generates the bitmap data which can be printed. Then, the CPU 11 outputs the bitmap data to the image forming section 15.

In addition, the CPU 11 performs the process which generates the bitmap data from these print data by band units.

<Transparency Process>

Next, a transparency process that the CPU 11 and the interpreter program 181 developed on the RAM 17 cooperatively execute will be described using FIGS. 4 to 8.

Figure 4:
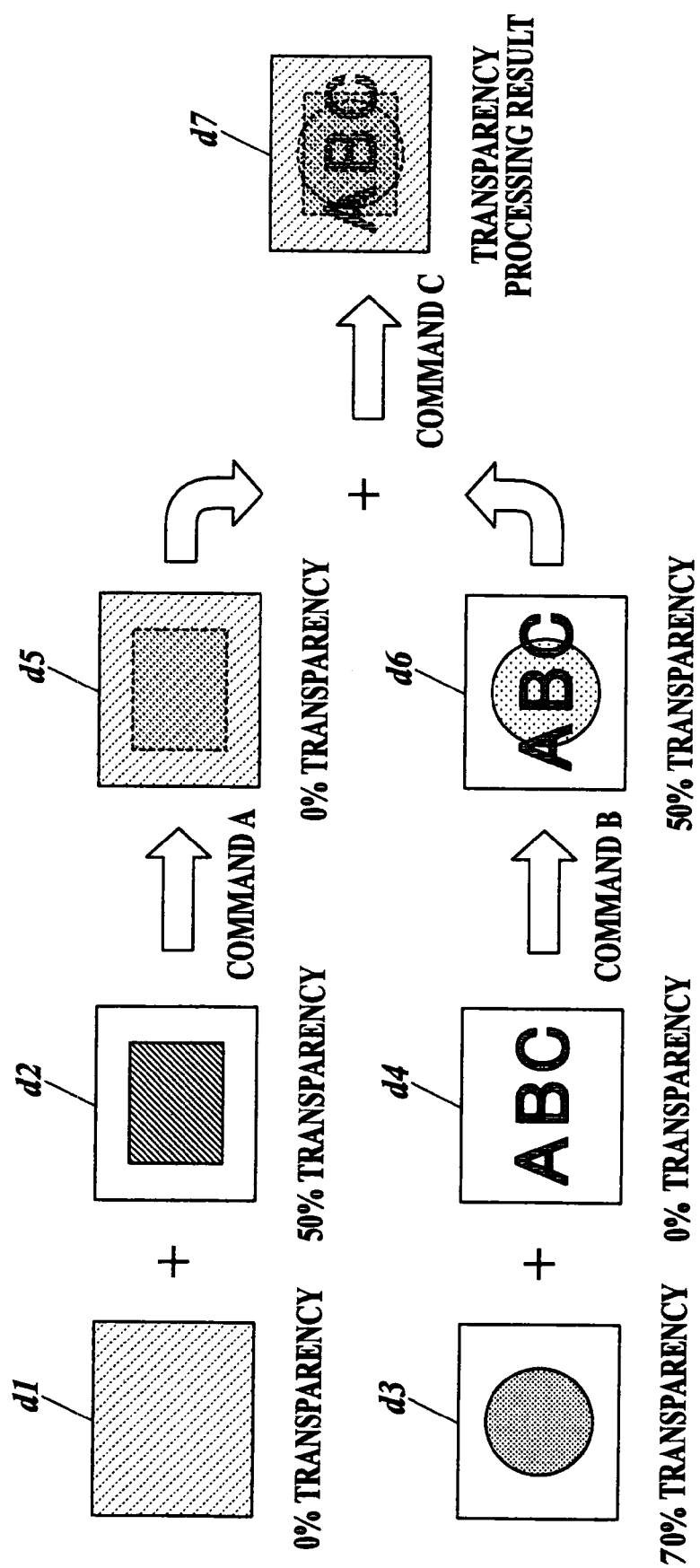
FIG. 4 is a diagram illustrating process images of transparency processes.

FIG. 4 is a diagram illustrating process images of transparency processes that are executed in accordance with execution commands (a command A, a command B, and a command C) of the transparency processes.

The command A is an execution command of a transparency process that overlaps image data d2 having 50% transparency to image data d1 having 0% transparency, using the image data d1 as a background. If the transparency process according to the command A is executed, image data d5 is generated.

Further, the command B is an execution command of a transparency process that overlaps image data d4 having 0% transparency to image data d3 having 70% transparency, using the image data d3 as a background. If the transparency process according to the command B is executed, image data d6 is generated.

Further, the command C is an execution command of a transparency process that overlaps the image data d6 having 50% transparency to the image data d5 having 0% transparency, using the image data d5 as a background. If the transparency process according to the command C is executed, image data d7 is generated.

Figure 5:
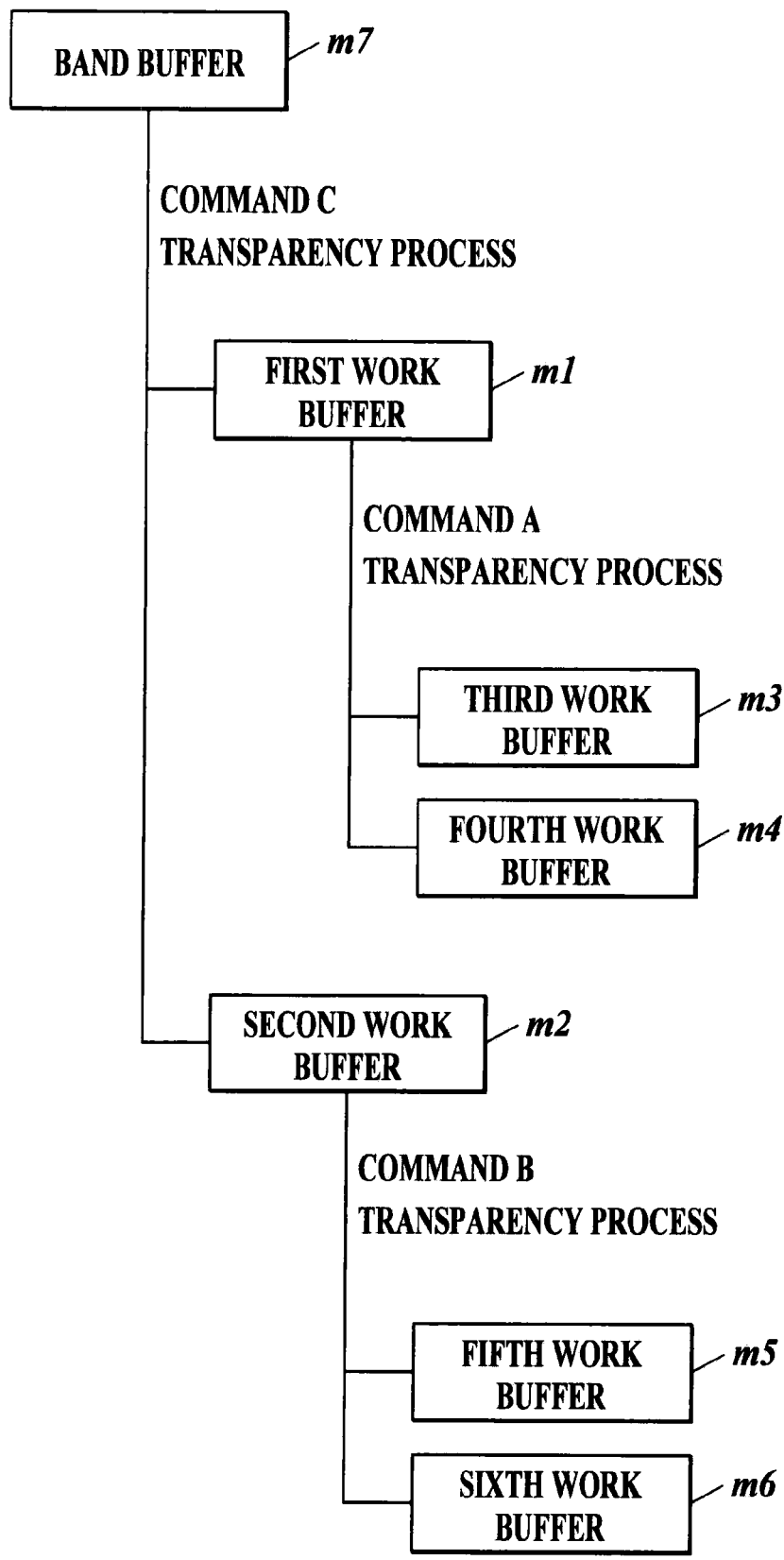
FIG. 5 shows a diagram illustrating images of a memory area to be ensured when executing transparency processes.

FIG. 5 is a diagram illustrating images of a storage area that the CPU 11 ensures when executing transparency processes according to the commands A, B, and C. The image diagram (FIG. 5) shows a storage area that corresponds to one band. The storage area is ensured in the RAM 17 or the HDD 19.

The CPU 11 ensures a first work buffer m1, a third work buffer m3, and a fourth work buffer m4 in order to execute a transparency process according to the command A. In this case, the third work buffer m3 is used for a process on the image data d1 (refer to FIG. 4). Further, the fourth work buffer m4 is used for a process on the image data d2 (refer to FIG. 4). In addition, the image data d5 (refer to FIG. 4) is stored in the first work buffer m1.

Further, the CPU 11 ensures a second work buffer m2, a fifth work buffer m5, and a sixth work buffer m6 in order to execute a transparency process according to the command B. In this case, the fifth work buffer m5 is used for a process on the image data d3 (refer to FIG. 4). Further, the sixth work buffer m6 is used for a process on the image data d4 (refer to FIG. 4). In addition, the image data d6 (refer to FIG. 4) is stored in the second work buffer m2.

Furthermore, in addition to the first work buffer m1 and the second work buffer m2, the CPU 11 ensures a band buffer m7 in order to execute a transparency process according to the command C. In this case, the first work buffer m1 is used for a process on the image data d5. Further, the second work buffer m2 is used for a process on the image data d6. In addition, the image data d7 (refer to FIG. 4) is stored in the band buffer m7.

Figure 6:
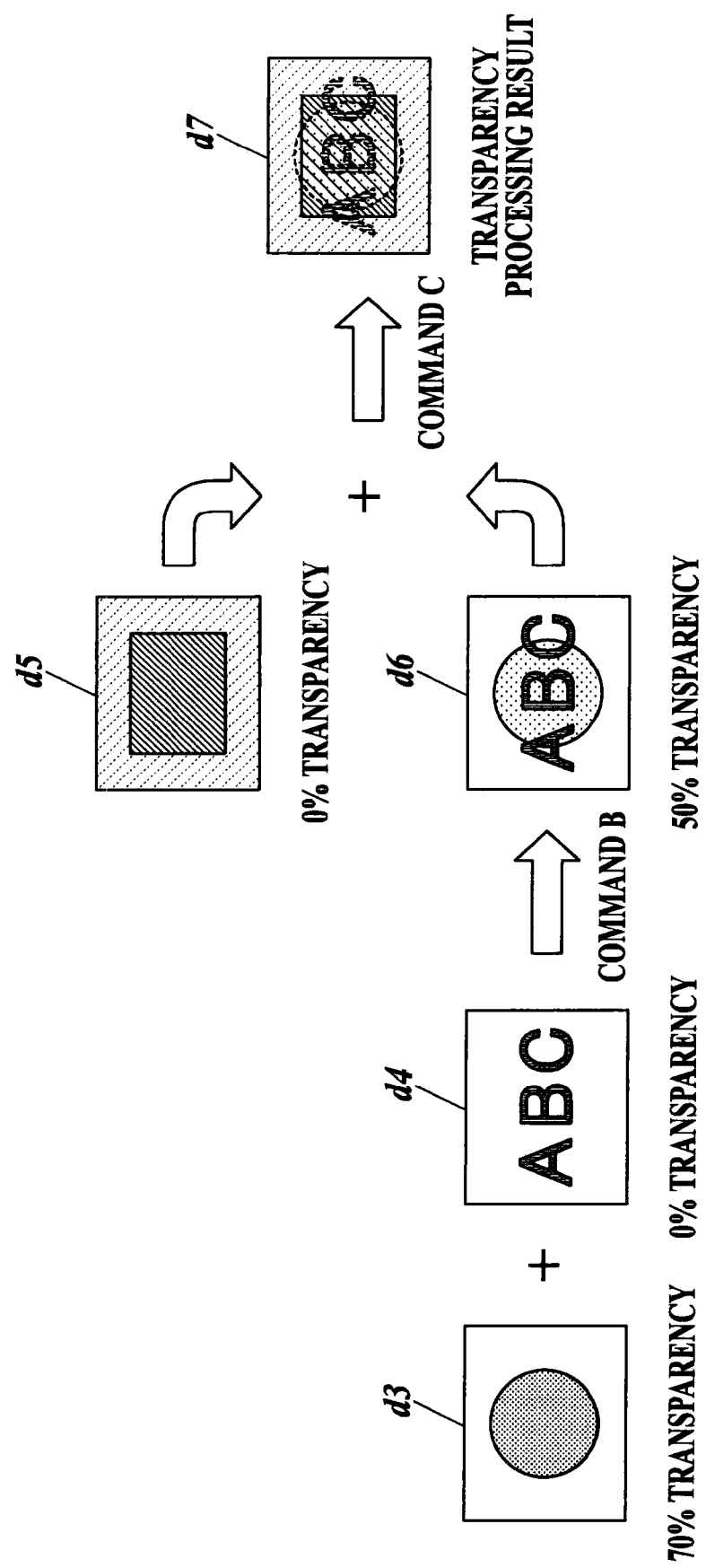
FIG. 6 is a diagram illustrating process images of selection transparency processes where a command A is omitted.

FIG. 6 is a diagram illustrating process images of transparency processes where a command A is omitted, that is, transparency processes according to commands B and C. Instead of execution of the command A, the CPU 11 overlaps the image data d2 having 0% transparency to the image data d1 having 0% transparency, using the image data d1 as a background. That is, the CPU 11 overlaps the image data d2 to the image data d1 without executing the transparency process (one color). In addition, the CPU 11 generates the image data d5.

When executing the transparency processes where the command A is omitted, the CPU 11 ensures the first work buffer m1, the second work buffer m2, the fifth work buffer m5, the sixth work buffer m6, and the band buffer m7 (refer to FIG. 5). That is, the CPU 11 ensures the storage area other than the third work buffer m3 and the fourth work buffer m4, in FIG. 5.

Figure 7:
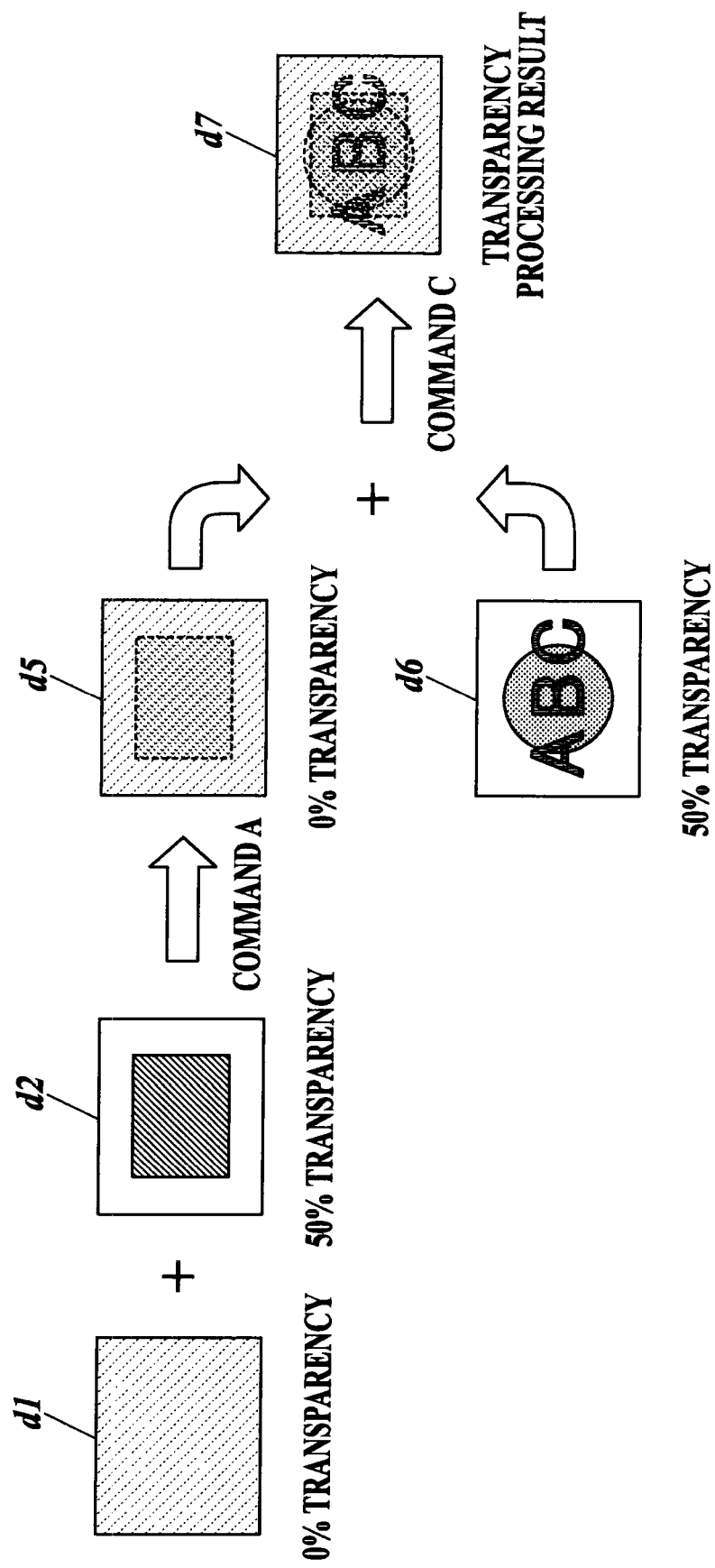
FIG. 7 is a diagram illustrating process images of selection transparency processes where a command B is omitted.

FIG. 7 is a diagram illustrating process images of transparency processes where a command B is omitted, that is, transparency processes according to commands A and C. Instead of execution of the command B, the CPU 11 overlaps the image data d4 having 0% transparency to image data d3 having 0% transparency, using the image data d3 as a background. That is, the CPU 11 overlaps the image data d4 to the image data d3 without executing the transparency process (one color). In addition, the CPU 11 generates the image data d6.

When executing the transparency processes where the command B is omitted, the CPU 11 ensures the first work buffer m1, the second work buffer m2, the third work buffer m3, the fourth work buffer m4, and the band buffer m7 (refer to FIG. 5). That is, the CPU 11 ensures the storage area other than the fifth work buffer m5 and the sixth work buffer m6, in FIG. 5.

Figure 8:
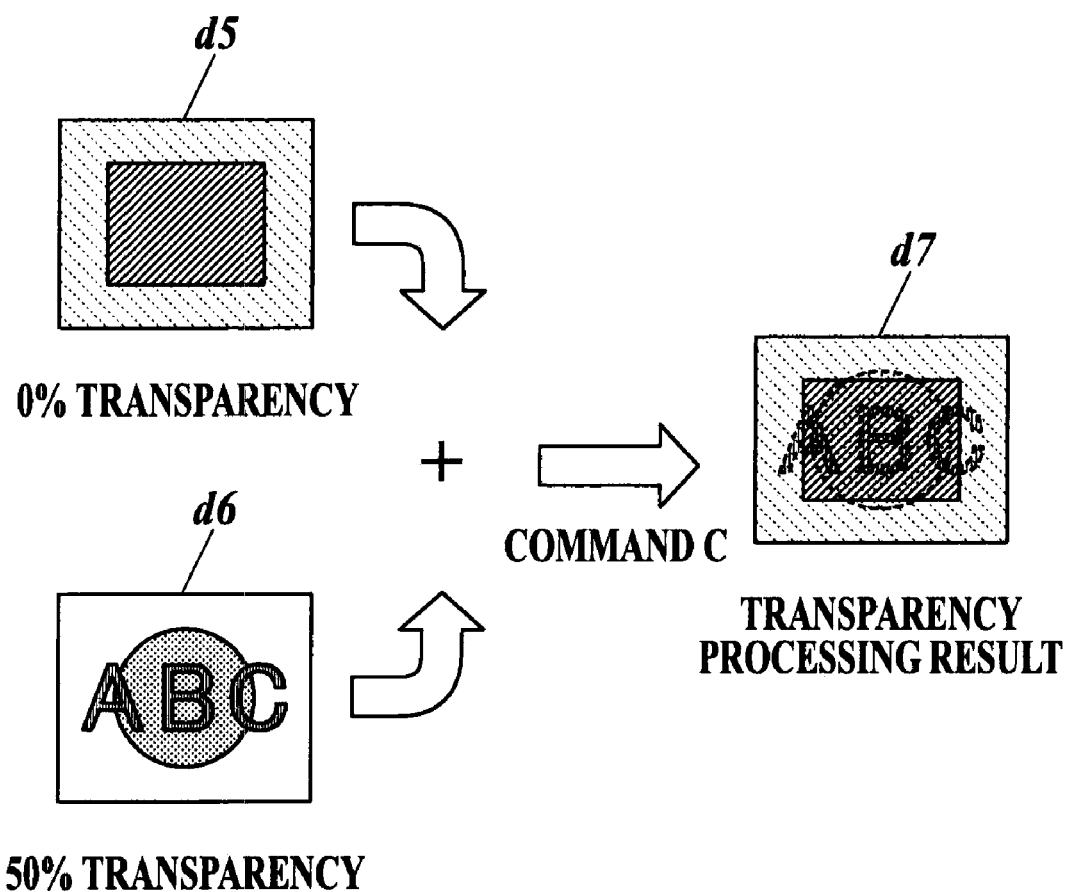
FIG. 8 is a diagram illustrating process images of a selection transparency process where commands A and B are omitted.

FIG. 8 is a diagram illustrating process images of a transparency process where commands A and B are omitted, that is, a transparency process according to a command C. Instead of execution of the command A, the CPU 11 overlaps the image data d2 having 0% transparency to the image data d1 having 0% transparency, using the image data d1 as a background. That is, the CPU 11 overlaps the image data d2 to the image data d1 without executing the transparency process (one color). In addition, the CPU 11 generates the image data d5. Instead of execution of the command B, the CPU 11 overlaps the image data d4 having 0% transparency to the image data d3 having 0% transparency, using the image data d3 as a background. That is, the CPU 11 overlaps the image data d4 to the image data d3 without executing the transparency process (one color). In addition, the CPU 11 generates the image data d6.

When executing the transparency process where the commands A and B are omitted, the CPU 11 ensures the first work buffer m1, the second work buffer m2, and the band buffer m7 (refer to FIG. 5). That is, the CPU 11 ensures the storage area other than the third work buffer m3, the fourth work buffer m4, the fifth work buffer m5, and the sixth work buffer m6, in FIG. 5.

As such, if the CPU 11 executes the transparency processes according to all the commands A, B, and C, as a process result, an excellent image quality of the image data d7 is obtained, but the used storage capacity may be increased. Therefore, when the storage area cannot be ensured in the RAM 17, the storage area needs to be ensured in the HDD 19, and the transparency process time may be increased. As such, a process where priority is given to an image quality is called an image quality priority process.

Further, if the CPU 11 executes the transparency process according to only the command C, as a process result, an image quality of the image data d7 is deteriorated, but the used storage capacity is decreased. Therefore, as compared with the image quality priority process, the possibility of ensuring the storage area in the RAM 17 is high. Accordingly, the transparency process time is shorter than the image quality priority process time. As such, a process where priority is given to a process speed is called a speed priority process.

Further, the transparency processes according to the commands B and C and the transparency processes according to the commands A and C are intermediate processes of the image quality priority process and the speed priority process. These processes are called intermediate processes.

<Image Forming Process>

Next, specific process contents of an image forming process that is executed by the image forming process 10 will be described using FIG. 9.

Figure 9:
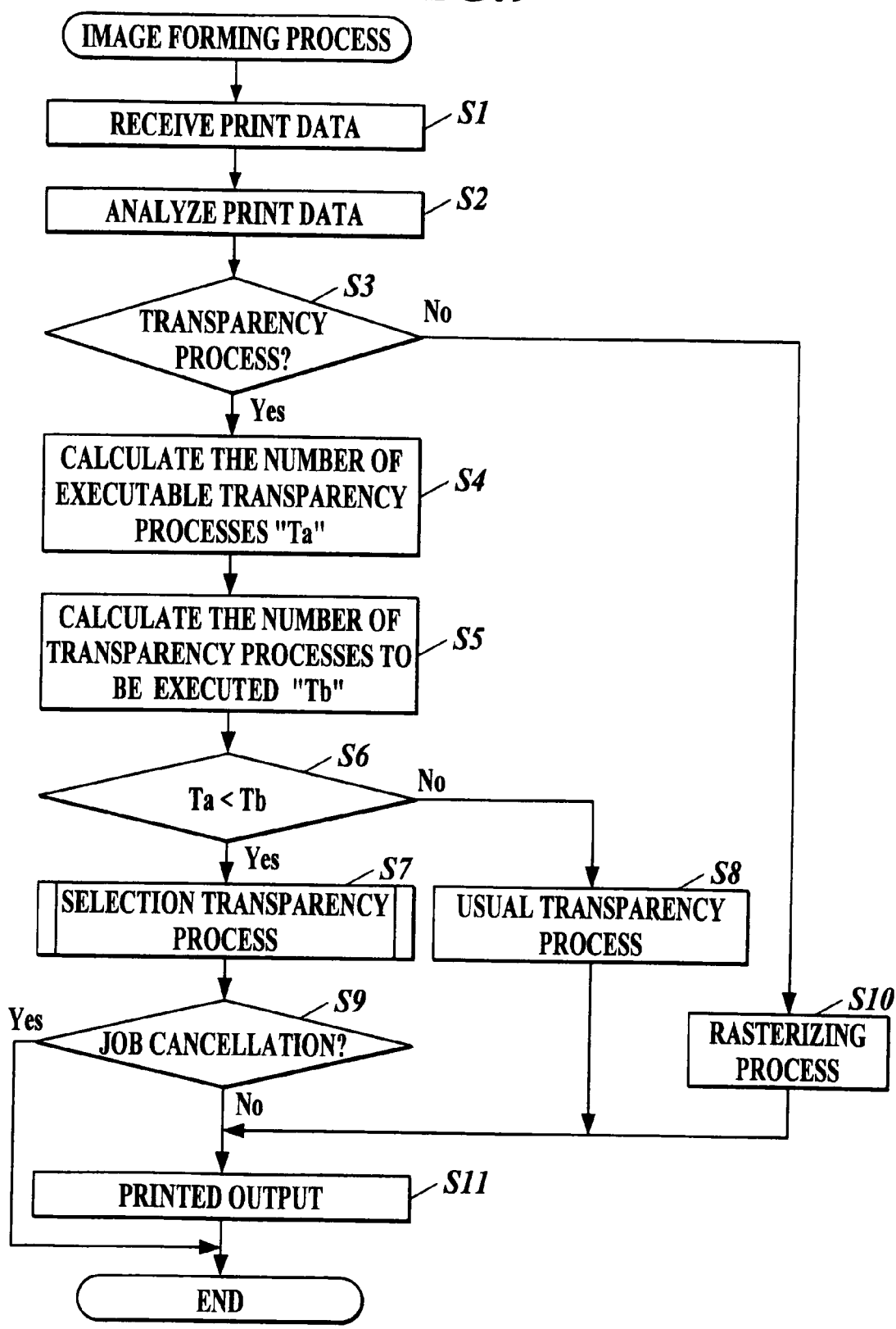
FIG. 9 is a flowchart illustrating an image forming process.

FIG. 9 is a flowchart illustrating an image forming process. This flowchart shows the case where only print data is considered as data that the image forming apparatus 10 receives from a client terminal 20. Further, examples of the print data include PDF data or XPS data. That is, the image forming apparatus 10 performs a PDF direct print or an XPS direct print.

First, the CPU 11 uses a communication unit 16 to receive print data from the client terminal 20, and stores the print data in the RAM 17 or the HDD 19 (Step S1). In addition, the CPU 11 analyzes the received print data (Step S2).

In addition, the CPU 11 determines whether an execution command of a transparency process is included in the print data. That is, the CPU 11 determines whether or not to execute the transparency process (Step S3).

For example, when a command of [/SMask <</S/Alpha /G{myform}>>/SetTransparency pdfmark] is included in the PDF data, the CPU 11 determines that the execution command of the transparency process is included in the print data (PDF data).

As the analysis result, when it is determined that the execution command of the transparency process is not included in the print data (Step S3: NO), the CPU 11 executes a rasterizing process on the intermediate data generated from the print data and generates printable bitmap data (Step S10). In addition, the CPU 11 outputs the bitmap data to the image forming unit 15 and performs a printed output (Step S11). Then, the image forming process is completed.

Meanwhile, as the analysis result, when it is determined that the execution command of the transparency process is included in the print data (Step S3: YES), the CPU 11 calculates the number of executable transparency processes "TA", on the basis of the number of work buffers (storage capacity) that can be ensured to execute the transparency process in the RAM 17 (Step S4).

In addition, the CPU 11 calculates the number of execution commands of the transparency processes to be processed, which is included in the print data. That is, the CPU 11 calculates the number of transparency processes to be executed "TB" (Step S5).

In addition, the CPU 11 compares the number of executable transparency processes "TA" and the number of transparency processes to be executed "TB" (Step S6). As such, since the CPU 11 compares the number of executable transparency processes "TA" and the number of transparency processes to be executed "TB", the CPU 11 can accurately determine whether a storage capacity of the RAM 17 is insufficient in executing the transparency process.

As the comparison result, when the number of transparency processes to be executed "TB" is smaller than or equal to the number of executable transparency processes "TA" (Step S6; NO), the CPU 11 executes a usual transparency process (Step S8). Specifically, when the commands A, B, and C that are the execution commands of the transparency processes are included in the print data, the CPU 11 ensures the memory area shown in FIG. 5 in the RAM 17, and executes a transparency process according to the command A, a transparency process according to the command B, and a transparency process according to the command C, which are shown in FIG. 4. In addition, the CPU 11 executes a rasterizing process on the intermediate data (data on which a transparency process is executed) generated from the print data, and generates printable bitmap data. In addition, the CPU 11 outputs the bitmap data to the image forming unit 15 and performs a printed output (Step S11). Then, the image forming process is completed.

Meanwhile, as the comparison result in Step S6, when the number of transparency processes to be executed "TB" is larger than the number of executable transparency processes "TA" (Step S6; YES), the CPU 11 executes a selection transparency process (Step S7). The selection transparency process will be described in detail below.

During the selection transparency process, when a job is cancelled (Step S9; YES), the CPU 11 completes the image forming process without performing the printed output.

Meanwhile, when the job is not cancelled and the selection transparency process is executed (Step S9; NO), the CPU 11 outputs the bitmap data generated during the selection transparency process to the image forming unit 15, and performs the printed output (Step S11). Then, the image forming process is completed.

<Selection Transparency Process>

Figure 10:
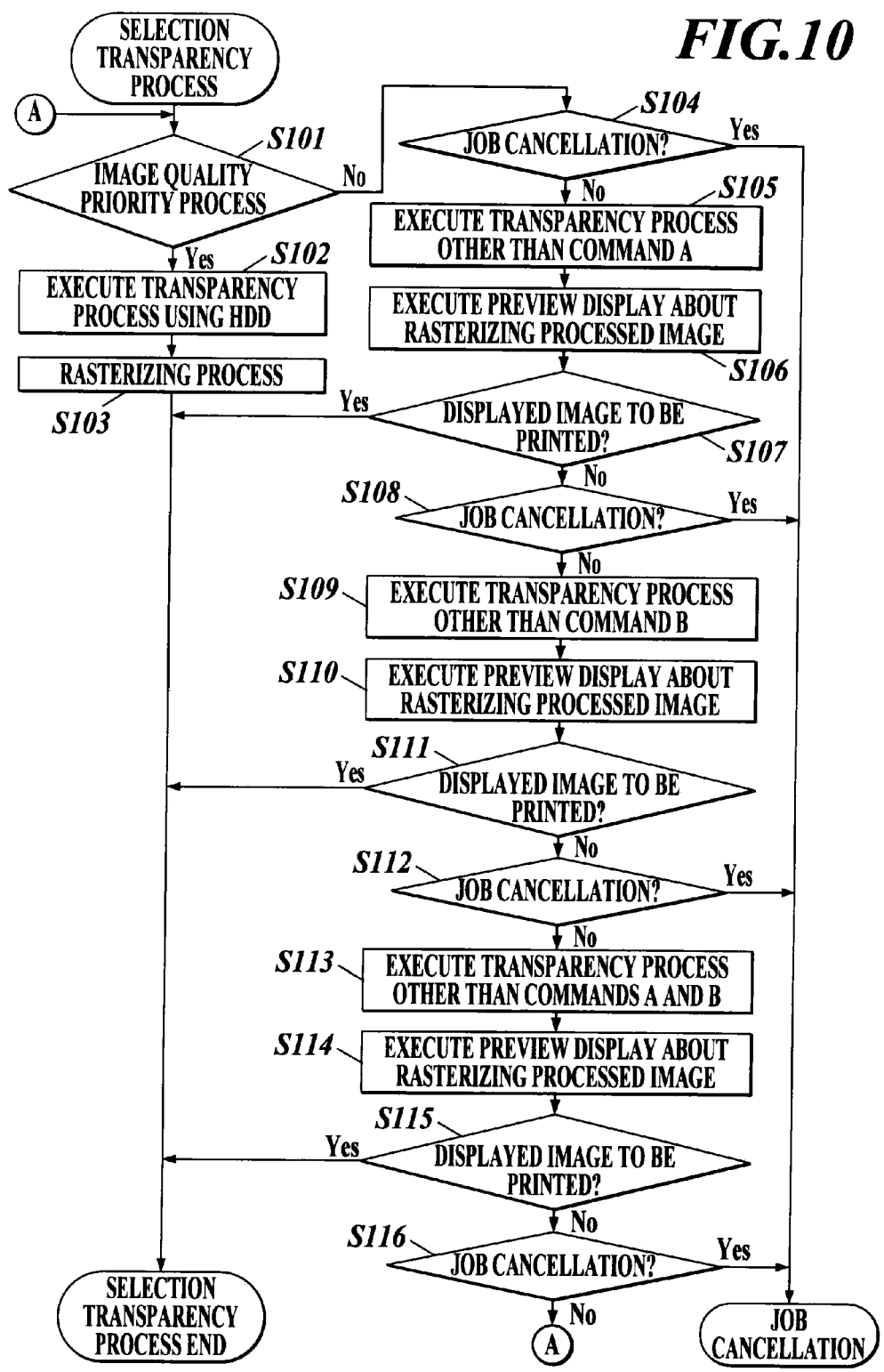
FIG. 10 is a flowchart illustrating selection transparency processes.
Figure 11:
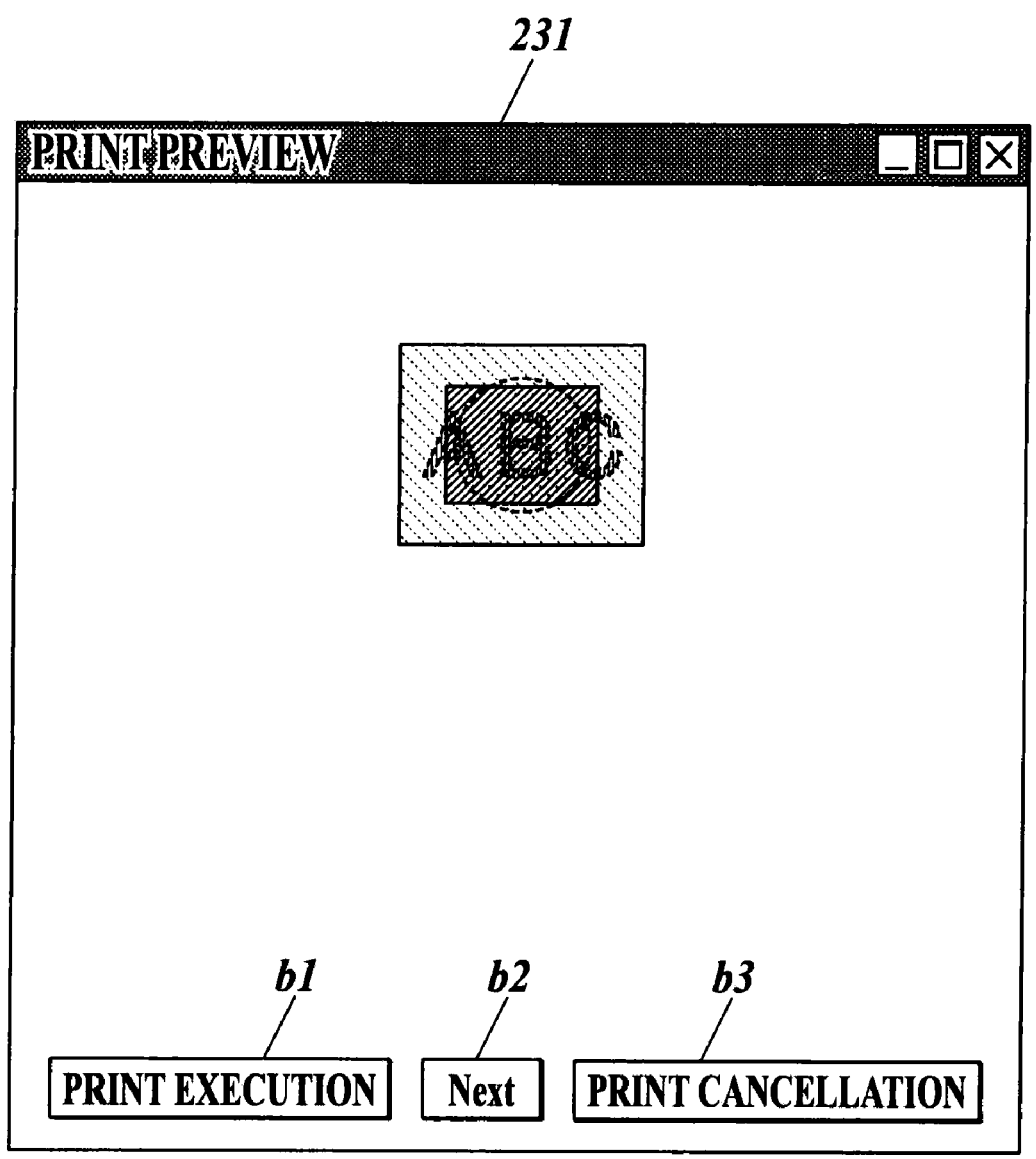
FIG. 11 is an example of a print preview screen.

Next, specific process contents of the selection transparency process (Step S7 of FIG. 9) will be described using FIGS. 10 and 11. The selection transparency process is a process that allows a user to select whether to execute an image quality priority transparency process (image quality priority process), a speed priority transparency process (speed priority process), or an image quality/speed intermediate transparency process (intermediate process) and executes the selected transparency process. In this case, the image quality priority process is a transparency process according to the commands A, B, and C. The speed priority process is a transparency process according to the command C. The intermediate process is a transparency process according to the commands B and C or a transparency process according to the commands A and C.

First, the CPU 11 displays a selection screen (not shown), which is used to select whether or not to execute the image quality priority process, on the display unit 23 of the client terminal 20. The user selects to execute the image quality priority process or cancel the job on the selection screen, and inputs an operation signal indicating the selection to the operation unit 22.

When receiving an operation signal, which indicates that the image quality priority process is executed, from the client terminal 20 through the communication unit 16 (Step S101; YES), the CPU 11 ensures the storage area (refer to FIG. 5) needed to execute the transparency process in the HDD 19 or the RAM 17 and the HDD 19. Then, the CPU 11 executes the transparency processes (refer to FIG. 4) according to the commands A, B, and C (Step S102). In addition, the CPU 11 executes a rasterizing process on the intermediate data (data on which the transparency process is executed) generated from the print data, and generates printable bitmap data (Step S103). Then, the selection transparency process is completed.

Further, when receiving an operation signal, which indicates that the job is cancelled, from the client terminal 20 through the communication unit 16 (Step S101; NO and Step S104; YES), the CPU 11 completes the selection transparency process without performing the transparency process or the rasterizing process.

Further, when receiving an operation signal, which indicates that the image quality priority process is not executed, from the client terminal 20 through the communication unit 16 (Step S101; NO and Step S104; NO), the CPU 11 executes the transparency processes (refer to FIG. 6) according to commands other than the command A (Step S105). At this time, the CPU 11 ensures a storage area (area other than the third work buffer m3 and the fourth work buffer m4 in FIG. 5) needed to execute the transparency processes according to the commands other than the command A (transparency processes according to the commands B and C) in the RAM 17. When the storage area cannot be ensured in the RAM 17, the CPU 11 ensures the storage area in the HDD 19. Alternatively, the process proceeds to [Step S109] from [Step S104; NO] without the processes of Steps S105 to S108.

In addition, the CPU 11 executes a rasterizing process on the intermediate data (data on which the transparency process is executed) generated from the print data, and generates printable bitmap data.

In addition, the CPU 11 displays a print preview screen 231 (refer to FIG. 11) on the display unit 23 of the client terminal 20 (Step S106). The print preview screen 231 displays a preview image, and includes a print execution button b1, a Next button b2, and a print cancellation button b3. In this case, the preview image is a bitmap image with respect to intermediate data on which the transparency processes according to the commands other than the command A are executed.

If the print execution button b1 is pressed, the CPU 21 of the client terminal 20 transmits (outputs) an instruction signal, which indicates that the preview image displayed on the print preview screen 231 is printed and output (selected), to the image forming apparatus 10 through the communication unit 24. When receiving the corresponding instruction signal through the communication unit 16 (Step S107; YES), the CPU 11 of the image forming apparatus 10 sets bitmap data of the preview image as data to be output to the image forming unit 15. In addition, the CPU 11 completes the selection transparency process.

If the print cancellation button b3 is pressed, the CPU 21 of the client terminal 20 transmits (outputs) an instruction signal, which indicates that a job is cancelled, to the image forming apparatus 10 through the communication unit 24. When receiving the corresponding instruction signal through the communication unit 16 (Step S107; NO and Step S108; YES), the CPU 11 of the image forming apparatus 10 completes the selection transparency process without executing the transparency process or the rasterizing process.

If the Next button b2 is pressed, the CPU 21 of the client terminal 20 transmits (outputs) an instruction signal, which indicates that the preview image displayed on the print preview screen 231 is not printed (not selected), to the image forming apparatus 10 through the communication unit 24.

When receiving the corresponding instruction signal through the communication unit 16 (Step S107; NO and Step S108; NO), the CPU 11 of the image forming apparatus 10 executes the transparency processes (refer to FIG. 7) according to the commands other than the command B (Step S109). At this time, the CPU 11 ensures the storage area (area other than the fifth work buffer m5 and the sixth work buffer m6 in FIG. 5) needed to execute the transparency processes according to the commands other than the command B (transparency processes according to the commands A and C) in the RAM 17. When the storage area cannot be ensured in the RAM 17, the CPU 11 ensures the storage area in the HDD 19. Alternatively, the process proceeds to [Step S113] from [Step S108; NO] without the processes of Steps S109 to S112.

In addition, the CPU 11 executes rasterizing process on the intermediate data (data on which the transparency process is executed) generated from the print data, and generates printable bitmap data.

In addition, the CPU 11 sets the preview image of the print preview screen 231 as the generated bitmap image (Step S110). That is, the CPU 11 sets the preview image as a bitmap image with respect to the intermediate data on which the transparency processes according to the commands other than the command B are executed.

In addition, if the print execution button b1 is pressed, the CPU 21 of the client terminal 20 transmits (outputs) an instruction signal, which indicates that the preview image displayed on the print preview screen 231 is printed and output (selected), to the image forming apparatus 10 through the communication unit 24. When receiving the corresponding instruction signal through the communication unit 16 (Step S111; YES), the CPU 11 of the image forming apparatus 10 sets bitmap data of the preview image as data to be output to the image forming unit 15. In addition, the CPU 11 completes the selection transparency process.

If the print cancellation button b3 is pressed, the CPU 21 of the client terminal 20 transmits (outputs) an instruction signal, which indicates that a job is cancelled, to the image forming apparatus 10 through the communication unit 24. When receiving the corresponding instruction signal through the communication unit 16 (Step S111; NO and Step S112; YES), the CPU 11 of the image forming apparatus 10 completes the selection transparency process without executing the transparency process or the rasterizing process.

If the Next button b2 is pressed, the CPU 21 of the client terminal 20 transmits (outputs) an instruction signal, which indicates that the preview image displayed on the print preview screen 231 is not printed (not selected), to the image forming apparatus 10 through the communication unit 24.

When receiving the corresponding instruction signal through the communication unit 16 (Step S111; NO and Step S112; NO), the CPU 11 of the image forming apparatus 10 executes the transparency process (refer to FIG. 8) according to the command other than the commands A and B (Step S113). At this time, the CPU 11 ensures a storage area (area other than the third work buffer m3, the fourth work buffer m4, the fifth work buffer m5, and the sixth work buffer m6 in FIG. 5) needed to execute the transparency process according to the command other than the commands A and B (transparency process according to the command C) in the RAM 17. When the storage area cannot be ensured in the RAM 17, the CPU 11 ensures the storage area in the HDD 19. Alternatively, the CPU 11 executes the process of [Step S101] right after the process of [Step S112] without executing the processes of Steps S113 to S116. As a result, only the image quality priority process can be executed.

In addition, the CPU 11 executes a rasterizing process on the intermediate data (data on which the transparency process is executed) generated from the print data, and generates printable bitmap data.

In addition, the CPU 11 sets the preview image of the print preview screen 231 as the generated bitmap image (Step S114). That is, the CPU 11 sets the preview image as a bitmap image with respect to the intermediate data on which the transparency process according to the command other than the commands A and B is executed.

In addition, if the print execution button b1 is pressed, the CPU 21 of the client terminal 20 transmits (outputs) an instruction signal, which indicates that the preview image displayed on the print preview screen 231 is printed and output (selected), to the image forming apparatus 10 through the communication unit 24. When receiving the corresponding instruction signal through the communication unit 16 (Step S115; YES), the CPU 11 of the image forming apparatus 10 sets bitmap data of the preview image as data to be output to the image forming unit 15. In addition, the CPU 11 completes the selection transparency process.

If the print cancellation button b3 is pressed, the CPU 21 of the client terminal 20 transmits (outputs) an instruction signal, which indicates that a job is cancelled, to the image forming apparatus 10 through the communication unit 24. When receiving the corresponding instruction signal through the communication unit 16 (Step S115; NO and Step S116; YES), the CPU 11 of the image forming apparatus 10 completes the selection transparency process without executing the transparency process or the rasterizing process.

If the Next button b2 is pressed, the CPU 21 of the client terminal 20 transmits (outputs) an instruction signal, which indicates that the preview image displayed on the print preview screen 231 is not printed (not selected), to the image forming apparatus 10 through the communication unit 24. When receiving the corresponding instruction signal through the communication unit 16 (Step S115; NO and Step S116; NO), the CPU 11 of the image forming apparatus 10 displays again a selection screen (not shown) on whether or not to execute the image quality priority process, on the display screen 23 of the client terminal 20. In addition, the CPU 11 returns to the process of Step S101.

Before displaying the selection screen (not shown) on whether or not to execute the image quality priority process, the CPU 11 may execute the processes of Steps S102 and S103, set the preview image of the print preview screen 231 as a bitmap image with respect to the intermediate data on which the transparency processes according the commands A, B, and C are executed, and allow a user to use the print execution button b1, the Next button b2, and the print cancellation button b3 to select whether or not to print and output the preview image.

In this flowchart, the bitmap data output to the image forming unit 15 and the bitmap data of the preview image are the same (for example, data having a resolution of 1200 dpi), but the present invention is not limited thereto. For example, bitmap data for a preview image having a low resolution (for example, a resolution of 92 dpi or 96 dpi) may be generated, and bitmap data for a printed output having a high resolution may be generated after the CPU 11 receives an instruction signal indicating that a printed output is performed.

As described above, according to this embodiment, in the case where the storage capacity of the RAM 17 used when the transparency process is executed is insufficient, the image forming apparatus 10 controls the number of transparency processes to be processed, and displays each preview image, on which the transparency processes of the different number of executions are executed, on the print preview screen 231 of the client terminal 20. In addition, the user selects an image that the user desires to perform a printed output while viewing the preview images displayed on the print preview screen 231, and performs a user operation indicating the selection with respect to the operation unit 22. That is, the user presses the print execution button b1. In addition, the image forming apparatus 10 determines an image becoming a printed output subject on the basis of an instruction signal output from the operation unit 22 (instruction signal output from the communication unit 16), and performs a printed output.

Therefore, during the image forming process that is executed on the basis of the print data including the execution command of the transparency process, an optimal process result can be provided to the user in the course of the process that the user desires.

Further, the image forming apparatus 10 may ensure the storage area, which is used when the transparency process is executed, in the HDD 19 other than the RAM 17. Therefore, it is possible to prevent a print error from being generated due to insufficiency of the storage capacity.

The image forming apparatus according to the embodiment is only exemplary, and the present invention is not limited thereto. The detailed configurations and the detailed operations of the functional units that constitute the image forming apparatus may also be appropriately changed.

For example, in the embodiment, the display unit 23 of the client terminal 20 displays the print preview screen 231, but the display unit 13 of the image forming apparatus 10 may display the print preview screen 231. In this case, an instruction signal, which indicates that the preview image is printed and output, is output from the operation unit 12 of the image forming apparatus 10.

Furthermore, in the embodiment, the ROM or the HDD is used as a computer readable medium that stores a program, but the present invention is not limited thereto. A nonvolatile memory, such as a flash memory, and a portable storage medium, such as a CD-ROM, can be applied as another computer readable medium. Further, a carrier wave (carrier) may be applied as a medium that provides data of a program through a communication line.

The entire disclosure of Japanese Patent Applications No. 2008-160142 filed on Jun. 19, 2008 including specifications, claims, drawings and summaries are incorporated herein by reference in their entirety.

The invention claimed is:

1. An image forming apparatus that executes an image forming process based on print data including an execution command of transparency processes, wherein each transparency process overlaps first image data having a first transparency and second image data having a second transparency, the image forming apparatus comprising:
a first storage unit to be used when a transparency process is executed; and
a control unit for controlling a first number of transparency processes to be executed when a storage capacity of the first storage unit is insufficient to execute the transparency processes to be executed, and causing a display unit to display a preview image to which a second number of executable transparency processes different from the first number has been executed to determine an image being an object for print output based on an instruction by an operator relating to which transparency process is executed and
wherein the control unit calculates the second number of executable transparency processes based on a usable storage capacity of the first storage unit, calculates the first number of transparency processes to be executed based on the print data, and judges whether the storage capacity of the fist storage unit is insufficient or not to execute the transparency processes to be executed by comparing the first number and the second number.

2. The image forming apparatus according to claim 1, further comprising:
a second storage unit an access speed of which is lower than that of the first storage unit,
wherein the control unit uses the second storage unit to execute the transparency processes to be executed when the storage capacity of the first storage unit is insufficient to execute the transparency processes to be executed.

3. The image forming apparatus according to claim 1, wherein the control unit controls the first number of transparency processes to be executed so as to give priority to an image quality of the image being the object for the print output when the storage capacity of the first storage unit is insufficient to execute the transparency processes to be executed.

4. The image forming apparatus according to claim 1, wherein the control unit controls the first number of transparency processes to be executed so as to give priority to a processing speed of the image forming process when the storage capacity of the first storage unit is insufficient to execute the transparency processes to be executed.

5. The image forming apparatus according to claim 1, further comprising:
the display unit; and
an operation unit for receiving the instruction by the operator,
wherein the control unit determines the image being the object for the print output based on the instruction received by the operation unit relating to which transparency process is executed.

6. A non-transitory computer readable storage medium storing a program for causing a computer to execute instructions for performing an image forming process based on print data including an execution command of transparency processes, wherein each transparency process overlaps first image data having a first transparency and second image data having a second transparency, the instructions comprising:
controlling a first number of transparency processes to be executed when a storage capacity of a first storage unit is insufficient to execute the transparency processes to be executed;
causing a display unit to display a preview image to which a second number of executable transparency processes different from the first number has been executed;
calculating the first number of transparency processes to be executed based on the print data;
calculating the second number of executable transparency processes based on a usable storage capacity of the first storage unit;
judging whether the storage capacity of the fist storage unit is insufficient or not to execute the transparency processes to be executed by comparing the first number and the second number; and
determining an image being an object for print output based on an instruction by an operator relating to which transparency process is executed.

7. The non-transitory computer readable storage medium according to claim 6, storing the program for causing the computer to execute further instructions comprising:
using a second storage unit having an access speed lower than that of the first storage unit to execute the transparency processes to be executed when the storage capacity of the first storage unit is insufficient to execute the transparency processes to be executed.

8. The non-transitory computer readable storage medium according to claim 6, storing the program for causing the computer to execute further instructions comprising:
controlling the first number of transparency processes to be executed so as to give priority to an image quality of the image being the object for the print output when the storage capacity of the first storage unit is insufficient to execute the transparency processes to be executed.

9. The non-transitory computer readable storage medium according to claim 6, storing the program for causing the computer to execute further instructions comprising:
controlling the first number of transparency processes to be executed so as to give priority to a processing speed of the image forming process when the storage capacity of the first storage unit is insufficient to execute the transparency processes to be executed.

10. The non-transitory computer readable storage medium according to claim 6, storing the program for causing the computer to execute further instructions comprising:
   receiving an instruction from an operator; and
   determining the image being the object for the print output based on the instruction relating to which transparency process is executed.

11. A computer-implemented image formation processing method of executing an image forming process based on print data including an execution command of transparency processes, wherein each transparency process overlaps first image data having a first transparency and second image data having a second transparency, the method comprising:
   controlling, using a processor, a first number of transparency processes to be executed when a storage capacity of a first storage unit is insufficient to execute the transparency processes to be executed;
   displaying on a display unit a preview image to which the second number of executable transparency processes different from the first number has been executed;
   calculating the first number of transparency processes to be executed based on the print data;
   calculating the second number of executable transparency processes based on a usable storage capacity of the first storage unit;
   judging whether the storage capacity of the fist storage unit is insufficient or not to execute the transparency processes to be executed by comparing the first number and the second number; and
   determining an image being an object for print output based on an instruction by an operator relating to which transparency process is executed.

12. The computer-implemented image formation processing method according to claim 11, further comprising:
   controlling the first number of transparency processes to be executed so as to give priority to a processing speed of the image forming process when the storage capacity of the first storage unit is insufficient to execute the transparency processes to be executed.

13. The computer-implemented image formation processing method according to claim 11, further comprising:
   using a second storage unit having an access speed lower than that of the first storage unit to execute the transparency processes to be executed when the storage capacity of the first storage unit is insufficient to execute the transparency processes to be executed.

14. The computer-implemented image formation processing method according to claim 11, further comprising:
   controlling the first number of transparency processes to be executed so as to give priority to an image quality of the image being the object for the print output when the storage capacity of the first storage unit is insufficient to execute the transparency processes to be executed.

15. The computer-implemented image formation processing method according to claim 11, further comprising:
   receiving an instruction from an operator; and
   determining the image being the object for the print output based on the instruction relating to which transparency process is executed.

* * * * *